(12) United States Patent
Allione et al.

(10) Patent No.: US 10,281,738 B2
(45) Date of Patent: May 7, 2019

(54) METHOD FOR MANUFACTURING AN OPHTHALMIC LENS

(71) Applicant: ESSILOR INTERNATIONAL (COMPAGNIE GENERALE D'OPTIQUE), Charenton-le-Pont (FR)

(72) Inventors: Pascal Allione, Charenton-le-Pont (FR); Cedric Begon, Charenton-le-Pont (FR); Bruno Fauquier, Charenton-le-Pont (FR); Alexandre Gourraud, Charenton-le-Pont (FR); Loic Quere, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 14/431,339

(22) PCT Filed: Sep. 26, 2013

(86) PCT No.: PCT/FR2013/052267
§ 371 (c)(1),
(2) Date: Mar. 26, 2015

(87) PCT Pub. No.: WO2014/049273
PCT Pub. Date: Apr. 3, 2014

(65) Prior Publication Data
US 2015/0241714 A1    Aug. 27, 2015

(30) Foreign Application Priority Data

Sep. 28, 2012 (FR) ...................... 12 59199

(51) Int. Cl.
*G02C 7/02* (2006.01)
*B29D 11/00* (2006.01)
*B33Y 10/00* (2015.01)
*B29C 64/00* (2017.01)
*B33Y 30/00* (2015.01)

(52) U.S. Cl.
CPC .............. *G02C 7/024* (2013.01); *B29C 64/00* (2017.08); *B29D 11/0073* (2013.01);
(Continued)

(58) Field of Classification Search
CPC ........... G02C 7/02; G02C 7/061; G02C 7/042
(Continued)

(56) References Cited

U.S. PATENT DOCUMENTS 4,679,918 A     7/1987  Ace
5,851,328 A    12/1998  Kohan
(Continued)

FOREIGN PATENT DOCUMENTS

DE   10 2009 004377 A1   7/2010
EP    1 918 760 A1       5/2008

OTHER PUBLICATIONS

International Search Report, dated Dec. 17, 2013, from corresponding PCT application.

*Primary Examiner* — Stephone B Allen
*Assistant Examiner* — Travis S Fissel
(74) *Attorney, Agent, or Firm* — Young & Thompson

(57) ABSTRACT

A method for manufacturing an ophthalmic lens (40) having at least one optical function, includes the step of additively manufacturing (118) a complementary optical element (12) by depositing a plurality of predetermined volume elements (24) of a material having a predetermined refraction index on a predetermined manufacturing substrate (10), the complementary optical element being configured such as to be assembled with an initial optical system (30), the manufacturing step including the step of determining a manufacturing setting (116) from properties relating to the deformation of the complementary optical element, which deformation is caused by transferring the latter onto the initial optical system, and the step of determining a setting
(Continued)

including the step of determining the deformation properties (113) of the complementary optical element from geometric properties of the manufacturing substrate and the initial optical system and from properties of the optical function to be provided to the ophthalmic lens.

19 Claims, 2 Drawing Sheets

(52) U.S. Cl.
CPC ........ B29D 11/00432 (2013.01); B33Y 10/00 (2014.12); G02C 7/027 (2013.01); B33Y 30/00 (2014.12)

(58) Field of Classification Search
USPC ............ 351/159.01, 159.41–159.49, 159.57, 351/159.74, 178; 264/1.21, 1.22, 1.23, 264/1.35
See application file for complete search history.

(56) References Cited

U.S. PATENT DOCUMENTS

| | | | |
|---|---|---|---|
| 6,682,193 B1* | 1/2004 | Morris | B29C 45/561 351/158 |
| 7,014,317 B2* | 3/2006 | Gupta | G02C 7/061 351/159.42 |
| 8,309,168 B2* | 11/2012 | Lacan | B24B 9/144 427/154 |
| 2003/0157245 A1* | 8/2003 | Tatman | G02B 5/0825 427/162 |
| 2003/0198705 A1* | 10/2003 | Foreman | B29D 11/00413 425/174.4 |
| 2004/0046287 A1* | 3/2004 | Andino | B29C 67/0066 264/401 |
| 2005/0046957 A1* | 3/2005 | Lai | B29D 11/00355 359/652 |
| 2006/0177638 A1* | 8/2006 | Shibuya | C23C 14/0021 428/212 |
| 2007/0121064 A1* | 5/2007 | Norrby | A61B 3/0025 351/159.01 |
| 2007/0231576 A1* | 10/2007 | Davis | B32B 27/36 428/412 |
| 2009/0228101 A1* | 9/2009 | Zadno-Azizi | A61F 2/1613 623/6.34 |
| 2009/0250828 A1* | 10/2009 | Rosen | B29D 11/00125 264/1.38 |
| 2011/0018150 A1* | 1/2011 | Silver | B29C 33/40 264/1.38 |
| 2012/0019938 A1* | 1/2012 | Yamada | B29C 43/02 359/797 |

\* cited by examiner

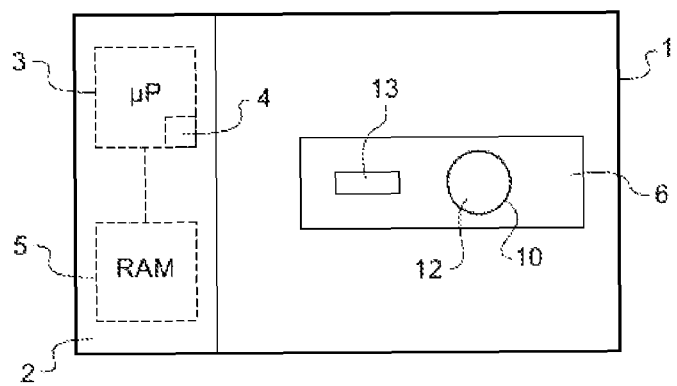
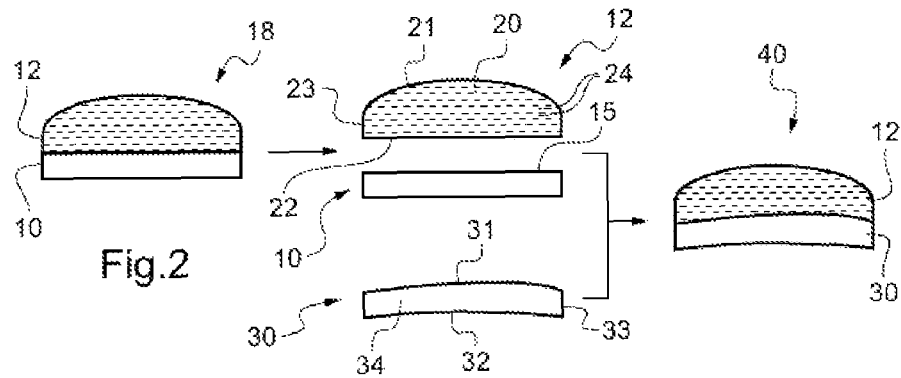
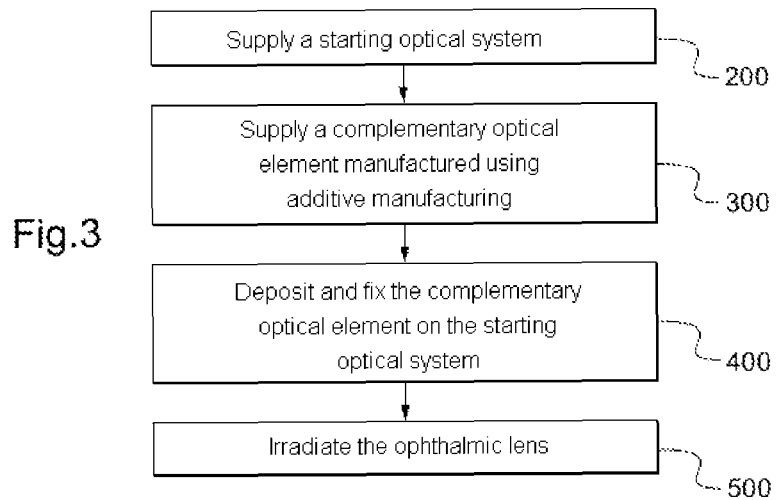

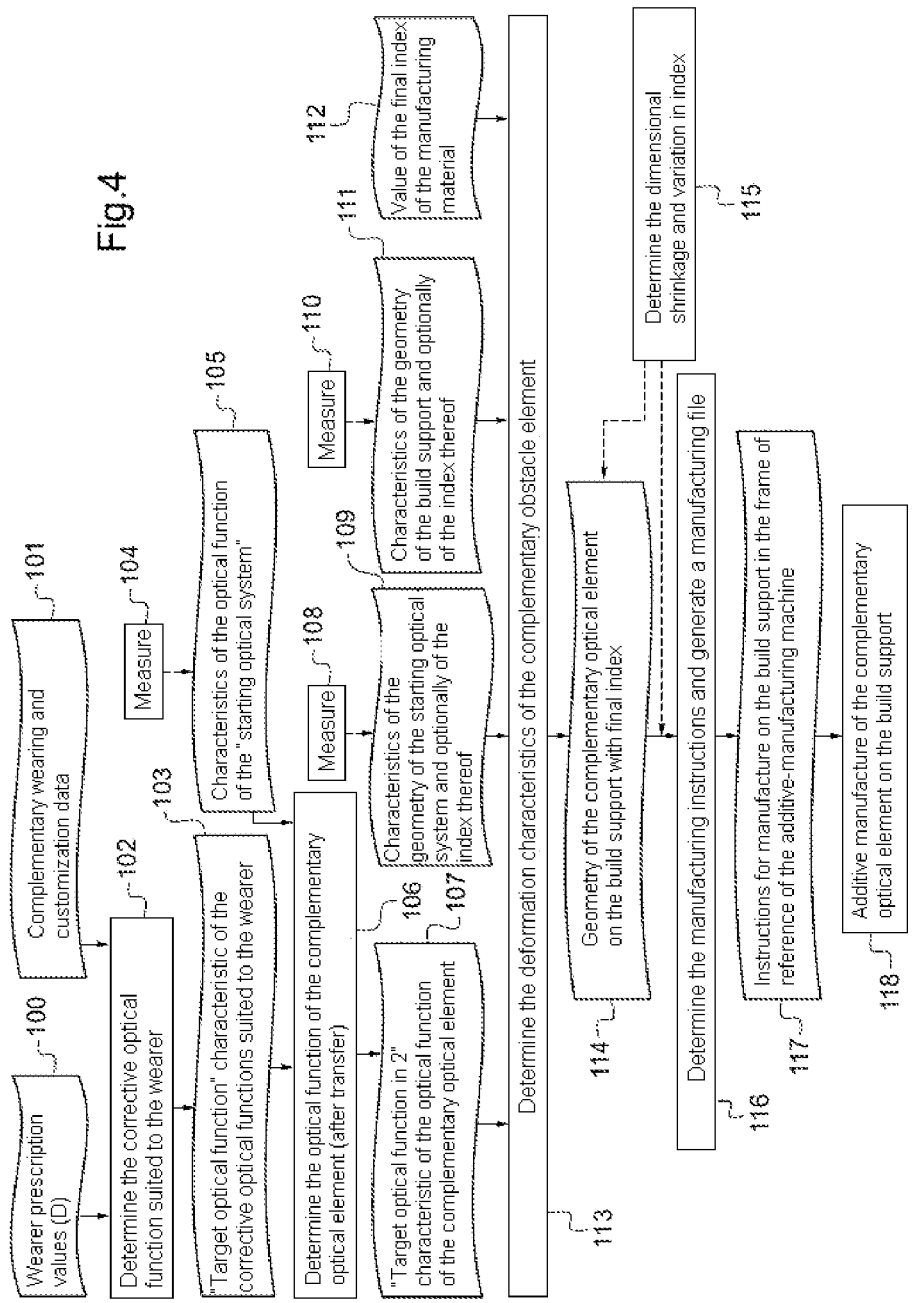

METHOD FOR MANUFACTURING AN OPHTHALMIC LENS

BACKGROUND OF THE INVENTION

Field of the Invention

The invention relates to the field of the manufacture of ophthalmic lenses having at least one optical function, for example varifocal ophthalmic lenses.

Description of the Related Art

The invention relates more specifically to a method for manufacturing such ophthalmic lenses.

The invention also relates to a manufacturing machine configured to manufacture such an ophthalmic lens.

It is known that ophthalmic lenses are subjected to various manufacturing steps in order to confer upon them the prescribed ophthalmic properties, which are, for example, complex.

Methods for manufacturing ophthalmic lenses which involve a step of supplying an unfinished or semi-finished lens blank, namely a lens blank that has neither or just one face finished (in other words one face which defines a simple or complex optical surface) are known.

These methods then involve a step of machining at least one face of the so-called unfinished lens blank by turning, in order to obtain what is referred to as a finished face, which defines the complex optical surface desired for providing the (complex or otherwise) ophthalmic properties prescribed for the wearer of the ophthalmic lens.

BRIEF SUMMARY OF THE INVENTION

The invention seeks to provide a method of manufacturing an ophthalmic lens having at least one complex optical function which differs from a method of machining by turning and which is particularly simple, convenient and economical to implement.

Thus a first aspect of the invention is a method of manufacturing an ophthalmic lens having at least one optical function, characterized in that it comprises a step of additively manufacturing a complementary optical element by depositing a plurality elements of predetermined volume of a material having a predetermined refractive index on a predetermined build support, said complementary optical element being configured to be assembled with a starting optical system;

with said additive manufacturing step comprising the step of determining manufacturing instructions from characteristics regarding the deformation of said complementary optical element caused by the transferring thereof to said starting optical system;

and with said step of determining manufacturing instructions comprising the step of determining said deformation characteristics of said complementary optical element from geometric characteristics of said build support, from geometric characteristics of said starting optical system and from characteristics of said optical function to be conferred on said ophthalmic lens.

The method of manufacture according to the invention advantageously makes it possible to obtain an ophthalmic lens that has an ophthalmic function, referred to as the target optical function, starting from a starting optical system which may be produced using various methods of manufacture, such as molding or machining, and by adding to this starting optical system a complementary optical element which is produced by additive manufacture, which complementary optical element supplies the ophthalmic lens with additional or non-additional ophthalmic properties.

It will be noted that it is chiefly the complementary optical element which confers the optical function on the ophthalmic lens, even if the starting optical system already has a simple or complex optical function. In other words, without this complementary optical element, the ophthalmic lens cannot exhibit the optical function prescribed for it. This complementary optical element therefore has nothing to do with a simple surface coating, such as an antireflective coating, an antifog coating, a scratchproof coating or even a dirt-resistant coating.

It will also be noted that by virtue of the step of determining the deformation characteristics of this complementary optical element, the latter is manufactured very precisely using additive manufacture. Specifically, this step notably makes it possible to take account, in order to form the complementary optical element, of the difference in geometry there is between the build support on which the complementary optical element is built and the starting optical system on which the complementary optical element is to be assembled in order to form the ophthalmic lens.

The method of manufacture according to the invention is therefore particularly simple, convenient and economical, particularly in a context where there is a very great diversity of optical functions to be achieved (because of the way in which these optical functions are customized), requiring rapid and flexible manufacturing methods.

It will be noted that additive manufacture here corresponds to a three-dimensional printing or stereolithography method, or even to a method of fused filament fabrication.

It will also be noted that what is meant by the optical function of a lens, of a system or of an optical element, is the optical response that this lens or this system or this element has, namely a function defining any change to the propagation and transmission of an optical beam through the lens, the system or the optical element concerned, whatever the angle of incidence of the incident optical beam and whatever the geometric extent of an input diopter illuminated by the incident optical beam.

More specifically, in the field of ophthalmics, the optical function is defined as the distribution of the wearer power and astigmatism characteristics and of the higher-order aberrations associated with the lens, with the system or with the optical element for all of the directions of the gaze of a wearer of this lens, of this system or of this element. That of course presupposes that the geometric positioning of the lens, of the system or of the optical element in relation to the eye of the wearer has been predetermined.

According to preferred, simple, convenient and economical features of the method according to the invention:

said optical function to be conferred on said ophthalmic lens is characteristic of prescription values associated with a wearer of said ophthalmic lens and optionally of complementary wearing and/or customization data;

said starting optical system has an initial optical function and said deformation characteristics are determined also from characteristics of said initial optical function of said starting optical system;

said deformation characteristics are determined also from a value of said refractive index of said material from which said complementary optical element is additively manufactured;

said step of determining manufacturing instructions further comprises the step of determining a dimensional shrinkage and/or a variation in the refractive index of said material of which said complementary optical element is additively manufactured;

said complementary optical element together with said build support are configured to be assembled with said starting optical system or said complementary optical element is configured to be removed from said build support before being assembled with said starting optical system;

said step of additive manufacture of said complementary optical element is carried out, on the basis of said determined manufacturing instructions, by said deposition of a plurality of said predetermined volume elements of a photo-polymerizable material in liquid form, and said additive-manufacture step is configured so that said complementary optical element obtained is at least partially deformable, for example in the form of a gel;

the method further comprises the step of supplying said starting optical system, the step of supplying said complementary optical element and the step of depositing and fixing said complementary optical element on said starting optical system in order to obtain said ophthalmic lens; and/or the method comprises a step of irradiating said ophthalmic lens.

A second aspect of the invention is an additive-manufacturing machine configured to manufacture an ophthalmic lens and comprising a command and control unit provided with systemic elements configured to execute a computer program comprising commands configured to implement each of the steps of the method of manufacture described hereinabove.

BRIEF DESCRIPTION OF THE DRAWINGS

The description of the invention will now be continued with a description of one embodiment, given by way of nonlimiting illustration, with reference to the attached drawings in which:

FIG. 1 schematically depicts an additive-manufacturing machine configured to produce at least one complementary optical element of an ophthalmic lens;

FIG. 2 schematically depicts various steps in the manufacture of an ophthalmic lens, at least partially using the machine illustrated in FIG. 1;

FIG. 3 is a block diagram illustrating various operating steps of a method of manufacturing an ophthalmic lens, including the steps illustrated in FIG. 2; and FIG. 4 is a block diagram illustrating other operating steps of the method of manufacturing an ophthalmic lens.

DETAILED DESCRIPTION OF THE PREFERRED EMBODIMENTS

FIG. 1 illustrates an additive-manufacturing machine 1, in this instance a numerically controlled three-dimensional printing machine numerical control referring to all of the hardware and software the notable function of which is to provide movement commands to all the parts of the additive-manufacturing machine 1.

This additive-manufacturing machine 1 is configured in this instance to deposit, by juxtaposition, a plurality of predetermined volume elements forming superposed layers (or in other words to deposit layer by layer) at least one material on a build support 10 to form a complementary optical element 12.

This complementary optical element 12 is configured to partially form an ophthalmic lens 40 (FIG. 2). It is therefore a complementary optical element referred to as an "ophthalmic" element, for example a varifocal element which also has toric and prismatic components.

Each predetermined volume element is defined by a predetermined composition and a predetermined size.

As the issue here is one of additive manufacture and, in particular, of three-dimensional printing, the expressions volumetric element or volume element, also referred to as a voxel (representative of a three-dimensional pixel) are also used.

This complementary optical element 12 is therefore supported by the build support 10.

It will be noted that this build support 10 is a predetermined support of the additive-manufacturing machine 1 and therefore that its geometric characteristics are known and held together in a file stored or loaded into a command and control unit 2 of the additive-manufacturing machine 1.

The collection of hardware and software of the additive-manufacturing machine 1 is also configured to give commands for the movement and manipulation of materials and polymerizing devices that this machine comprises.

The additive manufacturing machine 1 comprises a nozzle or a spray line 13 as well as the command and control unit 2, which is provided with a data processing system comprising a microprocessor 3 provided with a memory 4, notably a non-volatile memory, allowing it to load and store a software package, or in other words a computer program which, when executed in the microprocessor 3, allows an additive manufacturing method to be implemented. This non-volatile memory 4 is, for example of the ROM ("Read-Only Memory") type.

The unit 2 further comprises a memory 5, notably a volatile memory, in which data can be stored while the software is being executed and the additive manufacturing method is being run.

This volatile memory 5 is, for example, of the RAM or EEPROM (respectively "Random Access Memory" and "Electrically Erasable Programmable Read-Only Memory") type.

The additive-manufacturing machine 1 additionally comprises an opening 6, here a glazed opening, configured to access the complementary optical element 12 additively manufactured by this machine 1 on the build support 10 thereof.

It will be noted that in order to manufacture the complementary optical element 12 using additive manufacturing it is necessary to know precisely certain additive-manufacturing parameters, such as the speed of travel of the nozzle or nozzles 13, the power and power source used, in this instance a source that emits in the ultraviolet in the case of a three-dimensional printing machine, although it could be a laser in the case of a stereolithography machine or even heating energy in the case of fused deposition modeling, also referred to as fused filament fabrication.

There is also a need to know precisely the material or materials used and the state thereof, they here being in the form of a liquid photopolymer.

There is also a need to know precisely the simple or complex optical function or functions prescribed for the ophthalmic lens 40, which optical function is characterized by a geometry defined in a manufacturing file characteristic of the simple or complex optical properties of the ophthalmic lens 40.

It will be recalled that the optical function of a lens, of a system or of an optical element means the optical response of this lens or of this system or of this element, namely a function that defines any modification in the propagation and transmission of an optical beam through the lens, the system or the optical element concerned, whatever the angle of incidence of the incident optical beam and whatever the geometric extent of an input diopter illuminated by the incident optical beam.

More specifically, in the field of ophthalmics, the optical function is defined as the distribution of wearer power and astigmatism characteristics and of higher-order aberrations associated with the lens, with the system or with the optical element for all the directions of gaze of a wearer of this lens, of this system or of this element. That of course assumes that the geometric positioning of the lens, of the system or of the optical element with respect to the eye of the wearer has been predetermined.

It will also be noted that the wearer power is a way of calculating and of adjusting the power of the ophthalmic lens, which differs from the frontofocometric power. Calculating the wearer power ensures that the power perceived by the wearer (i.e. the power of the beam of light that enters the eye) once the lens is positioned in the frame and worn by the wearer, corresponds to the prescribed power. In general, at any point on the lens, notably at the points at which distance vision and close vision are checked, for a varifocal lens, the power measured with a frontofocometer differs from the wearer power. However, the wearer power at the optical center of a single-focus lens is generally close to the power observed with a frontofocometer positioned at this point.

FIG. 2 schematically shows various steps in a method of manufacturing the ophthalmic lens 40 starting from a starting optical system 30 and of the complementary optical element 12 additively manufactured on the build support 10.

It will be noted that the assembly formed by the complementary optical element 12 and the build support 10 forms an additive composition system 18. In addition, the build support may have optical properties compatible with ophthalmic use and, if it does, the additive composite system forms an additive optical system.

The build support 10 comprises a body provided with a build surface 15 which in this instance is of planar overall shape.

The complementary optical element 12 has a first force 21 which in this instance is convex and a second force 22 which in this instance is planar. This second face 22 is planar, i.e. has a curvature close to zero, because this is the face that faces the build surface 15 on which the complementary optical element 12 is additively manufactured. In this instance, "planar" does not necessarily mean "smooth" and does not necessarily exclude the presence of roughness.

This complementary optical element 12 also has a body 20 between the first face 21 and the second face 22 and a peripheral edge face 23 connecting the first face 21 to the second face 22.

The complementary optical element 12 is in this instance formed by a plurality of predetermined volume elements which are juxtaposed and superposed to form a plurality of superposed layers of a material 24.

This plurality of superposed layers forms the body 20 together with the first face 21 and the second face 22 of this complementary optical element 12.

It will be seen that the superposed layers of the first material 24 here have different lengths so as to form the first and second faces 21 and 22 of this complementary optical element 12.

These layers in this instance each have a thickness that is constant over the length and all have the same thickness.

It will be noted that this equality of thickness is obtained in this instance by virtue of the controlled and commanded spraying, by the nozzle or spray line 13 of the manufacturing machine 1, of a determined quantity of predetermined volume elements for each superposed layer of material 24.

It will be noted that the material 24 in this instance is an acrylic polymer, more specifically a photopolymer, for example a photopolymer such as the product marketed by the company OBJET Ltd, under the trade name of Vero-Clear™.

It will be noted that the additive manufacture of the complementary optical element 12 may necessitate, in addition to the deposition of the plurality of successive and superposed layers, one or more photopolymerization steps. It will also be noted, as will be seen in greater detail hereinafter, that the polymerization of the complementary optical element 12 may not be completely over at the end of the step of additive manufacture of this complementary optical element 12.

The starting optical system 30 for its part comprises a first face 31 which in this instance is curved and a second face 32 which in this instance is also curved and, more specifically, is concave.

This starting optical system 30 further comprises a body 34 between the first surface 31 and the second surface 32 and a peripheral edge face 33 connecting the first face 31 to the second face 32.

This starting optical system 30 is made of a material generally used for the manufacture of ophthalmic lens, such as the allylic polymer known by the name CR39.

This starting optical system 30 therefore also has a predetermined refractive index, for example equal to around 1.5.

It will be noted that the materials of which the starting optical system 30 and the complementary optical element 12 are formed and which are mentioned hereinabove have similar (or even close) refractive indexes, so as to minimize optical reflection at the interface.

It will also be noted that this starting optical system 30 here has a simple optical function (it could have a complex optical function) and that the characteristics of this simple optical function are known and characterized in a file stored or loaded into the command and control unit 2 of the additive-manufacturing machine 1.

FIG. 2 also shows the ophthalmic lens 40 formed from the complementary optical element 12 and from the starting optical system 30 which are assembled with one another.

The complementary optical element 12 is in this instance removed from the build support 10 to be deposited on the starting optical system 30, with the second face 22 of the complementary optical element 12 facing the first face 31 of the starting optical system 30, and this complementary optical element 12 is fixed to this starting optical system 30 in order to form the ophthalmic lens 40.

This fixing may for example be performed using an adhesive system or a glue. This may be an optical-quality pressure-sensitive adhesive (PSA) or a photopolymerizable transparent glue.

Thus, the ophthalmic lens 40 is manufactured with, as its front face, in this instance the first face 21 of the complementary optical element 12 and with, as its rear face, in this instance, the second face 32 of the starting optical system 30.

This ophthalmic lens 40 also comprises a body here formed of the body 20 and of the body 34 of the complementary optical element 12 and of the starting optical system 30 respectively.

This ophthalmic lens 40 thus has the optical function, in this instance a complex optical function, prescribed for it.

A method of manufacturing this ophthalmic lens 40 will now be described in greater detail with reference to FIGS. 3 and 4.

The method of manufacture comprises the step 200 of supplying the starting optical system 30.

The starting optical system 30 is chosen according to the lens 12 that is to be manufactured and its geometry is therefore known, which geometry is characterized by a surface file which is stored or loaded into the command and control unit 2 of the additive-manufacturing machine 1.

In instances in which the starting optical system 30 has an initial optical function, the latter is also known and characterized directly in the surface file.

The method also comprises the step 300 of supplying the complementary optical element 12 obtained by additive manufacture using this additive-manufacturing machine 1.

In this instance it is more particularly the additive composite system 18 which is supplied and, as mentioned hereinabove, the complementary optical element 12 is detached from the build support 10.

The method further comprises the step 400 of depositing and fixing this complementary optical element 12 on the starting optical system 30 as described hereinabove.

It will be also be noted that in order to assemble the complementary optical element 12 with the starting optical system 30 it is possible to use an assembly device such as the device described in French patent application FR 2 883 984 or else in American patent application US 2009/0165932.

The method further comprises the step 500 of irradiating the ophthalmic lens 40 obtained.

This step 500 consists in completing the polymerization of the complementary optical element 12 after the latter has been assembled with the starting optical system 30 so as to stabilize this assembly and therefore the ophthalmic lens 40.

It will moreover be noted that during this step 500, the adhesion of this element to the starting optical system 30 may also be consolidated, notably if this step 500 is a thermal and/or ultraviolet irradiation step. This step 500 is therefore referred to as the step that consolidates the material of the complementary optical element 12.

FIG. 4 illustrates steps in the manufacturing method and more particularly steps for determining a instructions for the manufacture of the complementary optical element 12 for the purposes of the additive manufacture thereof using the additive-manufacturing machine 1 illustrated in FIG. 1; and therefore for the purpose of supplying this complementary optical element 12 in the step 300 of the method illustrated in FIG. 3.

The command and control unit 2 of the additive-manufacturing machine 1 is configured to receive, in step 100, a file containing values of the prescription of a wearer of the ophthalmic lens 40 that is to be manufactured.

These wearer prescription values are generally expressed in diopters (D).

The unit 2 is also configured to receive, in step 101, complementary wearing and customization data associated with the wearer, with a frame intended to accept the ophthalmic lens 40 and with the prescription.

It will be noted that these complementary wearing and customization data correspond for example to geometric values which notably characterize the frame and the visual behavior of the wearer. They may, for example, refer to a distance between the eye and the lens and/or to a position of the center of rotation of the eye and/or an eye-head coefficient and/or a pantoscopic tilt and/or curvature of the frame.

The unit 2 is configured to determine, in step 102, a corrective optical function tailored to the wearer on the basis of the wearer prescription values and of the complementary wearing and customization data received in the respective steps 100 and 101, and as a function of the geometric positioning of the lens 40 in relation to the eye of the wearer.

This corrective optical function tailored to the wearer corresponds to the target optical function of the ophthalmic lens 40 that is to be manufactured (this is an initial instruction setpoint).

It will be noted that the corrective optical function tailored to the wearer can be determined for example using ray-plotting software that makes it possible to determine the wearer power and resulting astigmatism of the lens under the wearing conditions. Optimization may be carried out by following well known optical optimization methods.

It will also be noted that the step 101 is optional and therefore that the corrective optical function tailored to the wearer can be determined by the unit 2 in step 102 from the prescription values received in step 101 alone and as a function of the geometric positioning of the lens 12 with respect to the eye of the wearer.

The unit 2 is configured to generate, in step 103, a file referred to as the "target optical function 1" which characterizes this corrective optical function tailored to the wearer, from step 102 onward.

It will be noted that the "target optical function 1" file is a file referred to as a surface file which is provided for example with geometric characteristics in the form of x, y, z, θ coordinates at a finite number of points of characteristics associated with a refractive index, of various distances and angles such as those mentioned above.

It will be noted that the corrective optical function tailored to the wearer may, instead of being determined by the unit 2 in step 102 be received directly by this unit 2 in the form of such a file.

The unit 2 is configured to receive, in step 105, a file containing characteristics of the optical function of the starting optical system 30. This optical function may be a simple, complex or afocal (in other words zero) optical function.

This file is a file referred to as a surface file which is substantially similar to the "target optical function 1" file except that it does not characterize the ophthalmic lens 12 that is to be manufactured but characterizes the chosen starting optical system 30.

It will be seen that this file contains characteristics which in this instance are measured directly on this starting optical system 30, in step 104. These characteristics could be predetermined and known, without requiring measurement.

The unit 2 is configured to determine, in step 106, an optical function of the complementary optical element 12 that this element exhibits after transfer, namely when it has been assembled with the starting optical system 30.

This is in fact the optical function to be conferred on this complementary optical element 12, referred to as "target optical function 2", taking into consideration the fact that this element is combined with the starting optical system 30 (which itself has an initial optical function), so that the ophthalmic lens 40 resulting from assembling the complementary optical element 12 with the starting optical system 30 confers upon the wearer the corrective optical function that has been tailored to him.

This determining step 106 is therefore performed on the basis of the characteristics contained in the file generated in step 103 and the file received in step 105, these files respectively relating to the corrective optical function tailored to the wearer and to the optical function of the starting optical system 30.

The unit 2 is configured to generate, in step 107, a file referred to as "target optical function 2" which characterizes the optical function of the complementary optical element 12, from step 106 onward.

The unit 2 is also configured to receive, in step 109, a file containing characteristics regarding the geometry of the starting optical system 30 and, optionally, characteristics associated with the refractive index thereof.

It will be seen that this file contains geometric and/or index characteristics which in this instance are measured directly on this starting optical system 30, in step 108. These characteristics could be predetermined and known, without requiring measurement.

The unit 2 is configured to receive, in step 111, a file containing characteristics regarding the geometry of the build support 10 of the additive-manufacturing machine 1 and, optionally, characteristics connected with the refractive index of this build support 10.

It will be noted that the characteristics associated with the refractive index of this build support 10 are needed only if it is the additive composite system (forming an additive optical system) that is directly assembled with the starting optical system 30, whereas these characteristics are not needed in instances in which only the complementary optical element 12 is assembled with the starting optical system 30.

It will be seen that this file contains geometric and/or index characteristics which in this instance are measured directly on this build support 10, in step 110. These characteristics could be predetermined and known, without requiring measurements.

The unit 2 is also configured to receive, in step 112, a file containing characteristics associated with the refractive index of the material 24 used for the additive manufacture of the complementary optical element 12. This index is referred to as the final index because this is the index that this complementary optical element 12 is to exhibit once it has been assembled with the starting optical system 30 to form the ophthalmic lens 40.

The unit 2 is configured to determine, in step 113, the deformation characteristics of this complementary optical element 12 which are associated with the assembling thereof with the starting optical system 30.

These deformation features are determined from the characteristics and values generated or received in the files in steps 107, 109, 111 and 112, relating respectively to the target optical function of the complementary optical element 12 (after transfer), to the geometry and optionally the index of the starting optical system 30, to the geometry and optionally to the index of the build support 10, and to the value of the final index of the material of which the complementary optical element 12 is manufactured.

It will be noted that this step of determining the deformation characteristics can be characterized by the application of a geometric transfer law (also referred to as a geometry transfer law) from the characteristics and values indicated hereinabove so as to characterize the geometry of the complementary optical element 12 once it has been built on the build support 10, with its final index, and is ready to be assembled with the starting optical system 30.

The determination step 113 therefore makes it possible to take into consideration the geometric discrepancy there is between the build support 10 on which the complementary optical element 12 is built and the starting optical system 30 on which this complementary optical element 12 rests and is fixed. The transfer law therefore makes it possible to make a connection between the position of a predetermined volume element of the complementary optical element 12 obtained by additive manufacture on the build support 10 and the position that this same predetermined volume element will occupy in the final assembly, i.e. in the ophthalmic lens 40 (in other words after this complementary optical element 12 has been assembled with the starting optical system 30).

It will be noted that this transfer law is chosen in such a way as to take account of a three-dimensional field of deformation applied to the complementary optical element 12 during the assembly step 400 (FIG. 3) in which the latter is assembled with the starting optical system 30.

The unit 2 is also configured to generate in step 114 a file containing geometric characteristics of the complementary optical element 12 indicative of the desired geometry for this complementary optical element 12 once it has been built on the build support 10, with its final index (i.e. the index it will have once it has been polymerized or photopolymerized). The desired geometry takes into consideration the deformation of this complementary optical element 12 as it is being assembled with the starting optical system 30.

In other words, this file referred to as a surface file reflects a description of the desired geometry of this complementary optical element 12 that is to be manufactured with, in practice, a determined layout of the predetermined volume elements of the material or materials.

The unit 2 is configured optionally to determine, in step 115, a dimensional shrinkage and a variation in index of the complementary optical element 12.

It will be noted that here these are possible subsequent changes to the refractive index of the material 24 of which the complementary optical element 12 is made given that this index obtained on the build support 10 may then change toward another index after the complementary optical element 12 has been assembled on the starting optical system 30 (for example as a result of thermal effects involved in the assembly step or as a result of the effects of mechanical deformation).

This index may also change toward yet another index after a consolidation step, if there is one, for fixing this complementary optical element 12 on the starting optical system 30.

This determination step 115 also makes it possible to take into consideration the potential variation in geometry (dimensional shrinkage) and in index resulting from the implementation of this step referred to as the consolidation step.

It will be noted that this potential consolidation step may be needed, as indicated hereinabove, when the complementary optical element 12 obtained after additive manufacture is at least partially deformable, for example in the form of a gel. This is caused by the fact that the polymerization of this starting optical element 12 during the additive manufacture thereof has not been completed. The relative flexibility of this complementary optical element 12 obtained notably makes it easier for the assembly described hereinabove to be performed in step 400. When such is the case, the consolidation step in fact corresponds to the irradiation step 500.

The unit 2 is further configured to determine, in step 116, the instructions for manufacture of the complementary optical element 12 and to thus generate what is referred to as an "instructions" manufacturing file.

This step 116 of determining the instructions is carried out on the basis of characteristics that the file generated in step 114 contains relating to the geometry of the complementary optical element 12 on the build support 10, with final index, and from the determination of the dimensional shrinkage and variation in index in step 115.

The unit 2 is configured to generate, in step 117, the manufacturing file corresponding to the instructions for manufacture on the build support 10 (in a frame of reference of the additive-manufacturing machine 1).

This "instructions" file is similar to the geometry file generated in step 114 pertaining to the complementary optical element 12, except that it reflects a modified description of the desired geometry of this complementary optical element 12 that is to be manufactured with, in practice, a modified arrangement of the predetermined volume elements of the material or materials; these modifications being connected with a potential dimensional shrinkage during the consolidation step and with a potential variation in index of the complementary optical element 12, which potential shrinkage and variation are determined in step 115.

It is therefore this "instructions" file that characterizes the geometry and optical function to be conferred on the complementary optical element 12, accounting for the fact that it is combined with the starting optical system 30, in order to obtain an ophthalmic lens 40 that has the corrective optical function suited to the wearer.

It is also from this "instructions" file that characterizes the geometry and optical function to be conferred upon the complementary optical element 12 that the latter is manufactured.

For that, the unit 2 may also be configured to begin, in step 118, the additive manufacture of the complementary optical element 12 on the build support 10 in the additive-manufacturing machine 1, on the basis of the characteristics of the manufacturing file generated in step 117.

It will be seen (FIG. 4) that the results of the determination step 115 may be taken into account during the step 114 of generating the file reflecting the desired geometry of the complementary optical element that is to be manufactured. This file is therefore generated taking into account, in the event that the method involves a consolidation step, the variation in geometry and in index between the complementary optical element during assembly with the starting optical element and after the consolidation step. It will be noted that this in fact involves performing step 116 directly during step 114.

The command and control unit 2 is configured to run software for implementing the method of manufacturing the ophthalmic lens using the parameters received, so as to determine the manufacturing instructions, or even produce the complementary optical element and then the ophthalmic lens.

In an alternative form that has not been illustrated, a client-server communication interface comprises a side referred to as a supplier side and another side referred to as the client side, these two sides communicating via a network, for example of the internet type.

The supplier side comprises a server connected to a command and control unit of the same type as that of FIG. 1, but this time not incorporated into an additive-manufacturing machine, this server being configured to communicate with the internet interface.

The client side is configured to communicate with the internet interface and is connected to a command and control unit of the same type as that on the supplier side.

Furthermore, the client side unit is connected to an additive-manufacturing machine of the same type as that of FIG. 1 to manufacture the complementary optical element of the ophthalmic lens.

The unit is configured to receive, on the client side, the data files that correspond to steps 100 (optionally 101), 109, 111 and 112.

This unit sends these data via the internet interface and the server to the supplier-side unit to determine the manufacturing instructions for the manufacture of the complementary optical element.

Via its data-processing system, this unit executes the computer program it contains in order to implement the method of manufacture and thus deduce the manufacturing instructions for manufacturing the complementary optical element.

Via the server and the network the unit sends the client-side command and control unit a file representative of the determined manufacturing instructions.

This client-side unit is configured to execute software for implementing the method of manufacturing the ophthalmic lens, using the parameters received, so as to create the complementary optical element and then the ophthalmic lens.

In alternative forms that have not been illustrated:

the plurality of juxtaposed and superposed predetermined volume elements forms superposed layers each of which has a thickness that is either constant or varies along the length and/or which may or may not all have the same thickness;

the material is, for example, a transparent material deposited by stereolithography, this material being, for example, an epoxy polymer marketed by 3D SYSTEMS under the trade name Accura® ClearVue;

the material is a photopolymer containing one or more families of molecules having one or more acrylic, methacrylic, acrylate, methacrylate functions, a family of molecules having one or more epoxy, thioepoxy functions, a family of molecules having one or more vinyl ether, vinyl caprolactam, vinylpyrolidone functions or a combination of these functions; it being possible for the chemical functions mentioned to be borne by monomers or oligomers or a combination of monomers and oligomers;

the material may contain at least one photoinitiator;

the material may contain colloids, particularly colloid particles with dimensions for example smaller than the wavelength of visible light, such as, for example, colloid particles of silica oxide $SiO_2$ or colloid particles of zirconium oxide $ZrO_2$;

the material may, in at least some of the predetermined volume elements, contain a pigment or a colorant, for example a colorant belonging to the azo or rhodamine or cyanine or polymethine or merocyanine or fluoresceine or pyrylium or phthalocyanine or perylene or benzanthrone or anthrapyrimidine or anthrapyridone families or alternatively a colorant provided with metallic complexes such as chelates or cryptates of rare earths;

the starting optical system is made from other materials such as polycarbonate, polymethylmethacylate, polyamide or thiourethane or episulfide polymers, for example the materials marketed by Essilor under the names Orma, Airwear, Ormix, Stylis or Lineis, and the indexes are comprised for example in the range [1.5; 1.74] for the visible spectrum;

the method further comprises one or more other manufacturing steps, for example a step of polishing the ophthalmic lens or even a step of marking in order to form what are referred to as temporary marks;

the build support has a build surface on which the complementary optical element is built by additive manufacturing, which build surface is at least partially planar and/or at least partially spherical;

the additive optical system is directly deposited and fixed on the starting optical system and the ophthalmic lens is therefore thus formed by the starting optical system, the build support and the complementary optical element; further, if appropriate, the build support may, like the starting optical system, be formed of a material generally used for the manufacture of ophthalmic lenses and may also be an optical-quality polymer film such as a film of PET (polyethylene terephthalate) or TAC (cellulose triacetate) or PU (polyurethane) or COC (cyclo olefin copolymer or polymer) or PC (polycarbonate);

the method of manufacture comprises no additional thermal irradiation step but rather a step of irradiation with ultraviolet, or even no irradiation step at all;

the method of manufacture comprises a step in which the variation in index of the material of the complementary optical element may be taken into account in the form of an iterative optimization loop using known optimization procedures;

the ophthalmic lens comprises a starting optical system and two complementary optical elements positioned one on each side of the starting optical system (which is sandwiched); with at least one of the two complementary optical elements manufactured in the way described hereinabove taking into consideration not only the optical function of the starting optical element but also the optical function of the other of the two complementary optical elements;

the starting optical system is tinted and has absorption and/or is coated with a treatment configured such as to modify the transmission and/or mechanical stability characteristics thereof;

the material of the complementary optical element optionally contains one or more colorants and/or nanoparticles which are configured to modify the optical transmission and/or appearance thereof, and/or nanoparticles or additives that are configured to modify the mechanical properties thereof;

the additive-manufacturing machine is not a three-dimensional printing machine but rather a stereolithography machine (SLA which stands for "Stereolithography Apparatus") or a fused filament fabrication machine, also referred to as a Fused Deposition Modeling (FDM) machine;

the command and control unit comprises a microcontroller in place of the microprocessor;

the client-server communication interface comprises devices configured for transferring the complementary-optical-element manufacturing instructions determined by a computer program which comprises commands configured to implement each of the steps of the manufacturing method described hereinabove when this computer program is executed in a command and control unit which comprises systemic elements configured for executing said computer program;

the communication interface allows communication by means other than the internet network, for example via an intrinsic network or a secure private network; and/or the communication interface allows the entire computer program to be transferred to a remote data processing system for implementing the method of manufacture in another additive-manufacturing machine and, optionally, in one or more other assembly and/or polishing machines.

It must be recalled more generally that the invention is not restricted to the examples described and depicted.

The invention claim is:

1. A method of manufacturing an ophthalmic lens having at least one optical function, the method comprising:

a step of additively manufacturing a complementary optical element, made of a material having a predetermined refractive index, on a predetermined build support including a body having a build surface, the complementary optical element including a body defining a first face, a second face, and a peripheral edge connecting the first face and the second face of the complementary optical element, said complementary optical element being configured to be assembled with a starting optical system including a body defining a first face, a second face, and a peripheral edge connecting the first face and the second face of the starting optical system, the complementary optical element and the starting optical system being manufactured separately and then assembled, with said additive manufacturing step comprising the step of determining manufacturing instructions from characteristics regarding the deformation of said complementary optical element caused by the transferring thereof to said starting optical system, and with said step of determining manufacturing instructions comprising the step of determining said deformation characteristics of said complementary optical element from geometric characteristics of said build support, geometric characteristics of said starting optical system, and characteristics of said optical function to be conferred on said ophthalmic lens, wherein the predetermined build support is separately manufactured from the starting optical system, the optical function to be conferred on the ophthalmic lens is characteristic of prescription values associated with a wearer of the ophthalmic lens, the complementary optical element at least partially confers the optical function on the ophthalmic lens, said complementary optical element together with said build support are configured to be assembled with said starting optical system by being deposited and fixed on the starting optical system or said complementary optical element is configured to be removed from said build support before being assembled with said starting optical system by being deposited and fixed on the starting optical system, such that the ophthalmic lens comprises the body of the complementary optical element and the body of the starting optical system or the body of the complementary optical element, the body of the predetermined build support, and the body of the starting optical system such that the ophthalmic lens has a first face formed by one of the first face and the second face of the complementary optical element, and a second face formed by one of the first face and the second face of the starting optical system, and the ophthalmic lens is a spectacle lens configured to be worn by a wearer remotely to the eye of the wearer.

2. The method as claimed in claim 1, wherein said optical function to be conferred on said ophthalmic lens is further characteristic of complementary wearing and/or customization data.

3. The method as claimed in claim 1, wherein said starting optical system has an initial optical function and said deformation characteristics are also determined from characteristics of said initial optical function of said starting optical system.

4. The method as claimed in claim 1, wherein said deformation characteristics are also determined from a value of said refractive index of said material from which said complementary optical element is additively manufactured.

5. The method as claimed in claim 1, wherein said determining manufacturing instructions further comprises one or more of determining a dimensional shrinkage and a variation in the refractive index of said material of which said complementary optical element is additively manufactured.

6. The method as claimed in claim 1, wherein said additively manufacturing said complementary optical element is carried out, based on said determined manufacturing instructions, by said deposition of a plurality of said predetermined volume elements of a photo polymerizable material in liquid form, said complementary optical element obtained being at least partially deformable.

7. The method as claimed in claim 1, further comprising
supplying said starting optical system;
supplying said complementary optical element; and
depositing and fixing said complementary optical element on said starting optical system in order to obtain said ophthalmic lens.

8. The method as claimed in claim 1, further comprising irradiating said ophthalmic lens.

9. An additive manufacturing machine configured to manufacture an ophthalmic lens, the machine comprising:
a command and control unit provided with systemic elements configured to execute a computer program comprising instructions configured to implement the method as claimed in claim 1.

10. The method as claimed in claim 2, wherein said starting optical system has an initial optical function and said deformation characteristics are also determined from characteristics of said initial optical function of said starting optical system.

11. The method as claimed in claim 2, wherein said deformation characteristics are also determined from a value of said refractive index of said material from which said complementary optical element is additively manufactured.

12. The method as claimed in claim 3, wherein said deformation characteristics are also determined from a value of said refractive index of said material from which said complementary optical element is additively manufactured.

13. The method as claimed in claim 2, wherein said determining manufacturing instructions further comprises one or more of determining a dimensional shrinkage and a variation in the refractive index of said material of which said complementary optical element is additively manufactured.

14. The method as claimed in claim 2, wherein said additively manufacturing said complementary optical element is carried out, based on said determined manufacturing instructions, by said deposition of a plurality of said predetermined volume elements of a photo polymerizable material in liquid form, said complementary optical element obtained being at least partially deformable.

15. The method as claimed in claim 2, further comprising
supplying said starting optical system;
supplying said complementary optical element; and
depositing and fixing said complementary optical element on said starting optical system in order to obtain said ophthalmic lens.

16. The method as claimed in claim 2, further comprising irradiating said ophthalmic lens.

17. The method as claimed in claim 6, wherein the complementary optical element is a gel.

18. The method as claimed in claim 1, further comprising:
determining the characteristics of the optical function to be conferred on the ophthalmic lens from a target optical function which characterizes the optical function to be conferred on the complementary optical element that the complementary optical element exhibits after the complementary optical element has been assembled with the starting optical system; and
determining the target optical function from another target optical function which characterizes the corrective optical function tailored to a wearer of the ophthalmic lens and from characteristics of the optical function of the starting optical system.

19. A method of manufacturing an ophthalmic lens having at least one optical function, the method comprising:
a step of additively manufacturing a complementary optical element, made of a material having a predetermined refractive index, on a predetermined build support including a body having a build surface, the complementary optical element including a body defining a first face, a second face, and a peripheral edge connecting the first face and the second face of the complementary optical element, said complementary optical element being configured to be assembled with a starting optical system including a body defining a first face, a second face, and a peripheral edge connecting the first face and the second face of the starting optical system, the complementary optical element and the starting optical system being manufactured separately and then assembled as a final assembly, with said additive manufacturing step comprising
the step of determining manufacturing instructions from characteristics regarding the deformation of said complementary optical element caused by the transferring thereof to said starting optical system, and with said step of determining manufacturing instructions comprising
the step of determining said deformation characteristics of said complementary optical element from geometric characteristics of said build support, geometric characteristics of said starting optical system, and characteristics of said optical function to be conferred on said ophthalmic lens,
wherein a position of a volume element of the final assembly is predetermined by a position of a volume element of the complementary optical element,
the optical function to be conferred on the ophthalmic lens is characteristic of prescription values associated with a wearer of the ophthalmic lens,
the complementary optical element at least partially confers the optical function on the ophthalmic lens,
said complementary optical element together with said build support are configured to be assembled with said starting optical system by being deposited and fixed on the starting optical system or said complementary optical element is configured to be removed from said build support before being assembled with said starting optical system by being deposited and fixed on the starting optical system, such that the ophthalmic lens comprises the body of the complementary optical element and the body of the starting optical system or the body of the complementary optical element, the body of the predetermined build support, and the body of the starting optical system such that the ophthalmic lens has a first face formed by one of the first face and the second face of the complementary optical element, and a second face formed by one of the first face and the second face of the starting optical system, and the ophthalmic lens is a spectacle lens configured to be worn by a wearer remotely to the eye of the wearer.

* * * * *